United States Patent [19]

Yamaguchi

[11] 4,442,156
[45] Apr. 10, 1984

[54] WINDOW WEATHER STRIPPING AND THE MANUFACTURING METHOD

[75] Inventor: Toshiaki Yamaguchi, Chiba, Japan

[73] Assignee: Kinugawa Rubber Industrial Co., Ltd., Chiba, Japan

[21] Appl. No.: 370,675

[22] Filed: Apr. 22, 1982

[30] Foreign Application Priority Data

| Apr. 23, 1981 | [JP] | Japan | 56-61624 |
| Apr. 23, 1981 | [JP] | Japan | 56-61625 |
| Apr. 23, 1981 | [JP] | Japan | 56-61626 |
| Apr. 23, 1981 | [JP] | Japan | 56-58804[U] |
| Jun. 16, 1981 | [JP] | Japan | 56-88441[U] |
| Jun. 16, 1981 | [JP] | Japan | 56-88442[U] |

[51] Int. Cl.³ ............................................. B32B 27/08
[52] U.S. Cl. .................................... 428/142; 49/475; 428/143; 428/144; 428/147; 428/323
[58] Field of Search .................. 49/475; 428/327, 323, 428/142, 148, 149, 331

[56] References Cited

U.S. PATENT DOCUMENTS

| 3,218,186 | 11/1965 | De Vries | 117/29 |
| 3,594,049 | 7/1971 | Turner | 308/72 |
| 4,035,436 | 7/1977 | Matsubara et al. | |
| 4,242,396 | 12/1980 | Wilson et al. | 428/141 |

FOREIGN PATENT DOCUMENTS

| 52-12310 | 1/1977 | Japan . |
| 56164819 | 5/1980 | Japan . |
| 55-160063 | 12/1980 | Japan . |
| 55-157662 | 12/1980 | Japan . |
| 55-157660 | 12/1980 | Japan . |
| 55-157661 | 12/1980 | Japan . |

OTHER PUBLICATIONS

Chinnery, "Part I: Elastomeric Dynamic Seals," Jun., 1970, Eng. Dig., vol. 31, No. 6, p. 63.

Primary Examiner—George F. Lesmes
Assistant Examiner—P. R. Schwartz
Attorney, Agent, or Firm—Lowe, King, Price & Becker

[57] ABSTRACT

Window weather stripping for sealing a gap between a movable glass and a window frame having less frictional sliding resistance and longer life time at a lower manufacturing cost. The window weather stripping according present invention comprises at least one microscopically rough surface on which the window glass slides, the rough surface being formed by first painting a bonding agent onto a surface and next spraying particles onto the painted bond or by simply applying a bonding agent mixed with particles. The diameter of the particles is from 5 to 500 micron and the hardness of the particles is from 2 to 7 on the Mohs scale. Talc, nylon, silica, graphite molybdenum, etc. are used as the particles.

5 Claims, 26 Drawing Figures

FIG. 6-A PRIOR ART
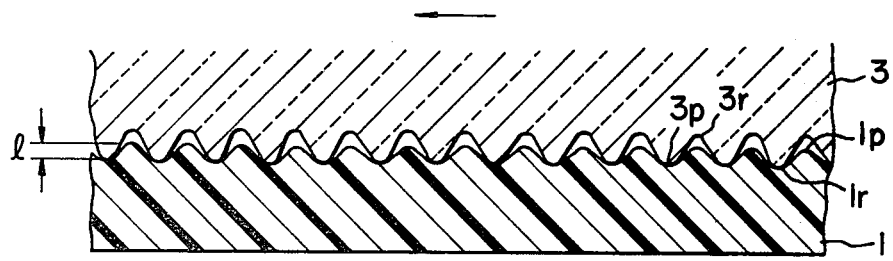
FIG. 6-B PRIOR ART
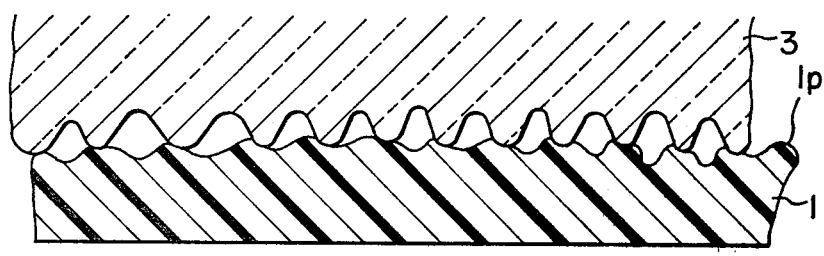
FIG. 6-C PRIOR ART
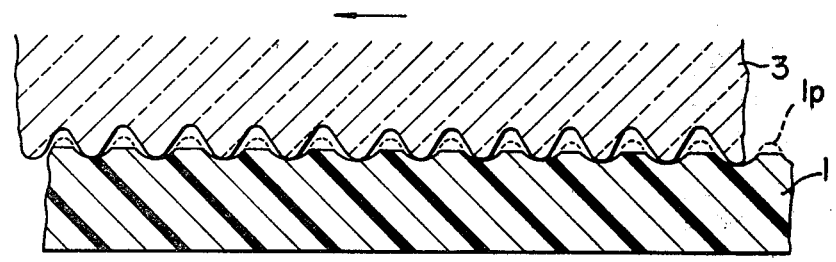

FIG. 25

| SAMPLE LABEL | A | B | C | D | E | F | G |
|---|---|---|---|---|---|---|---|
| PROJECTIONS | YES | NO | NO | NO | NO | NO | NO |
| PARTICLES (PARTICLE DIA) | NO | NO | TALC (8μ) | NYLON POWDER (60μ) | NYLON POWDER (100μ) | NYLON FILM ON SAMPLE E | TEXTILE NAP |
| MIXED RATIO | | | 25% | 25% | 25% | | |
| NO BOND | 1.88 | 2 OR MORE (CLOSE CONTACT) | | | | | |
| URETHANE BOND | | 2 OR MORE (CLOSE CONTACT) | 0.67 | 0.36 | 0.16 | 0.17 | 0.32 |
| NYLON BOND | | 0.34 | 0.23 | 0.20 | 0.15 | | |

WINDOW WEATHER STRIPPING AND THE MANUFACTURING METHOD

BACKGROUND OF THE INVENTION

1. Field of the Invention

The present invention relates generally to window weather stripping and a manufacturing method therefor, and more specifically to window weather stripping having rough surfaces thereon for sealing a gap between a movable window glass and a window frame, and a manufacturing method therefor.

2. Description of the Prior Art

The background of the present invention will be explained with respect to its application to window weather stripping used for an automotive vehicle.

An automotive vehicle normally employs various movable window glasses which move up and down, or open and close in the manner of a sliding door, or a single swinging door. In such cases, the sliding resistance between the glass and the weather stripping should be as small as possible without adversely affecting airtightness and life.

There exists a conventional window weather stripping, the surface of which is provided with a textile nap in order to reduce sliding resistance between the window glass and the weather stripping and to improve sealing effect. In such window weather stripping, however, the manufacturing cost is relatively high because of the electrostatic napping method, the attached nap can be easily removed or worn away, and the lift time of the nap tends to be short.

Another conventional weather stripping material has a number of projections on its surface in order to improve the sealing effect. In this case, however, the sliding resistance is relatively great.

Exemplary prior-art window weather stripping will be described in more detail with reference to the attached drawings under DETAILED DESCRIPTION OF THE PREFERRED EMBODIMENTS.

SUMMARY OF THE INVENTION

With these problems in mind, therefore, it is the primary object of the present invention to provide window weather stripping with small sliding resistance between the weather strip and window glass, and an extended life.

Further, it is the other object of the present invention to provide a method of manufacturing window weather stripping having smaller sliding resistance in a mass-production system so as to minimize manufacturing cost.

To achieve the above-mentioned object, the window weather stripping according to the present invention comprises a microscopically rough surface including particles with an appropriate diameter on at least one sliding surface of the weather strip with the movable window glass. The particles are fixed on the sliding surface by first painting a bonding agent and by next spraying the particles onto it or by painting on a bonding agent mixed with the particles. The diameter of the particles is from 5 to 500 microns; the hardness of the particles is from 2 to 7 on the Mohs scale (softer than the window glass but harder than the weather strip body); the material of the particles may be talc, nylon, sicila, graphite, molybdenum bisulfide, etc.

To achieve the above-mentioned object, the method of manufacturing the window weather stripping according to the present invention comprises the steps of extrusion-molding a rubber material into a predetermined shape, vulcanizing the extension-molded rubber material, painting a bonding agent onto the sliding surfaces of the rubber material, spraying particles onto the painted bonding agent to form rough sliding surfaces, drying the painted bonding agent, and baking the dried bonding agent. In the other method mentioned above, it is also possible to form the rough sliding surfaces by simply painting a bonding agent mixed with particles on the sliding surface thereof.

Further, in the case where a thermoplastic synthetic resin material is used for the weather stripping material, the step of annealing the resin material is included in the last manufacturing steps, instead of the step of vulcanization.

BRIEF DESCRIPTION OF THE DRAWINGS

The features and advantages of the window weather stripping according to the present invention over the prior-art window weather stripping will be more clearly appreciated from the following description of the preferred embodiments of the invention taken in conjunction with the accompanying drawings in which like reference numerals designate the same or similar elements or sections throughout the figures thereof and in which:

FIG. 6-A is an enlarged cross-sectional view microscopically showing a sliding surface of the prior art window weather stripping, indicating that the projected portions of the weather stripping are interengaged with the recessed portions of the window glass;

FIG. 6-B is an enlarged cross-sectional view microscopically showing a sliding surface of the prior-art window weather stripping, indicating that the projected portions of the weather stripping are partially worn away;

FIG. 6-C is an enlarged cross-sectional view microscopically showing a sliding surface of the prior-art window weather stripping, indicating that the projected portions of the weather stripping are nearly worn away;

FIG. 25 shows a list of the friction coefficients of various window weather stripping according to the present invention for comparison with those of the prior-art window weather stripping.

DETAILED DESCRIPTION OF THE PREFERRED EMBODIMENTS

To facilitate understanding of the present invention, a brief reference will be made to prior-art window weather stripping, with reference to the attached drawings.

The doors of an automotive vehicle are provided with various windows with movable window glass, which are usually sealed by window weather stripping made of rubber or synthetic resin. According to the positions at which weather stripping is used, there are various kinds of weather stripping.

Figure 1:
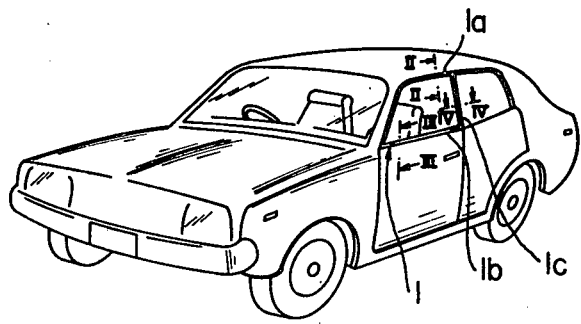
FIG. 1 is a perspective view of an example of an automotive vehicle on which window weather stripping is mounted.
Figure 2:
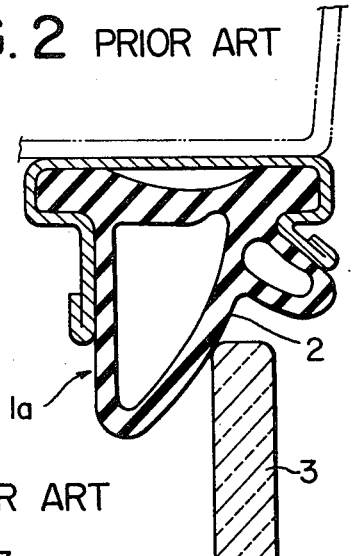
FIG. 2 is an enlarged cross-sectional view taken along the lines II—II of FIG. 1, showing a prior-art window weather stripping.
Figure 3:
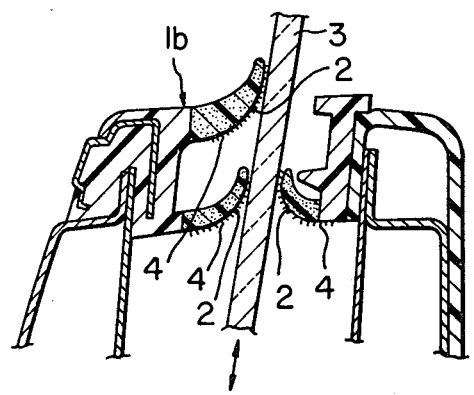
FIG. 3 is an enlarged cross-sectional view taken along the lines III—III of FIG. 1, showing another prior-art window weather stripping on the surface of which textile nap is provided.
Figure 4:
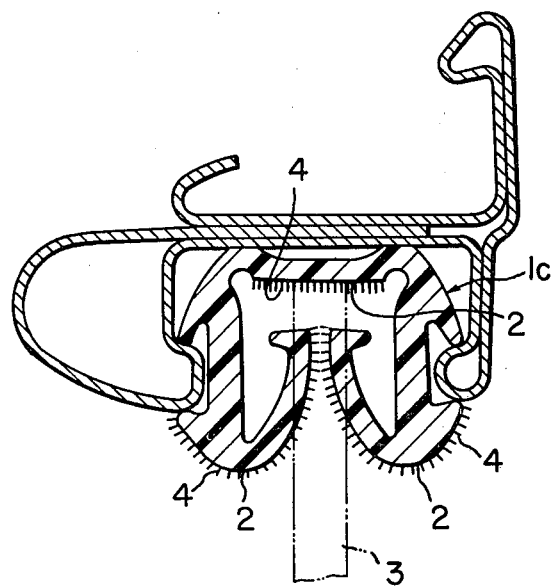
FIG. 4 is an enlarged cross-sectional view taken along the lines IV—IV of FIG. 1, showing the other prior-art window weather stripping on the surface of which textile nap is also provided.

In FIG. 1, in the case of the front side door of an automotive vehicle, for instance, there are used three kinds of window weather stripping such as the upper window weather stripping shown in FIG. 2, the lower window weather stripping shown in FIG. 3 and the side window weather stripping shown in FIG. 4. Further, the door weather stripping is usually made of rubber or thermoplastic synthetic resin such as vinyl chloride.

FIG. 2 shows an example of a prior-art upper window weather stripping 1a, on the sliding surface of which no special treatment is provided. In such window weather stripping, there exist shortcomings such that the sliding resistance between the sliding surface 2 and the window glass 3 is relatively large and the sliding surface is easily damaged or worn away.

FIG. 3 shows another example prior-art lower window weather stripping 1b, on the sliding surfaces 2 of which velvet-like soft textile nap 4 is provided.

FIG. 4 shows the other example prior-art side window weather stripping 1c, on the sliding surfaces 2 of which the same velvet-like soft textile nap 4 is provided.

In these lower and side window weather stripping 1b and 1c, however, the manufacturing cost is relatively high because of the electrostatic napping method used, the textile nap is easily removed or worn away, that is, the life time of the nap is not sufficiently long, and further, rain water in the nap does not drain well.

Figure 5:
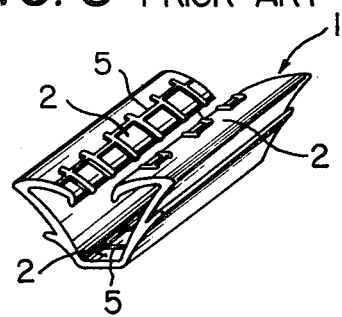
FIG. 5 is an enlarged perspective view showing the other prior-art window weather stripping on the surface of which a number of projections are formed.

FIG. 5 shows another example of prior-art window weather stripping, on the sliding surfaces 2 of which a number of projections 5 are formed. In this window weather stripping, the sliding resistance is noticeably increased.

FIGS. 6-A, B, and C microscopically show the interface of the window weather stripping, without textile nap, with window glass, for assistance in explaining the sliding resistance.

The reason why the sliding resistance of the prior-art window weather stripping is relatively great may be due to the fact that: since the weather stripping 1 is softer than window glass 3, the sliding surface of the weather stripping 1 is easily deformed plastically into the recessed portions 3r on the window glass surface as depicted in FIG. 6-A and therefore the projection portions 1p of the weather stripping 1 interengaged with the recessed portions 3r on the window glass surface are worn away by the projection portions 3p of the window glass 3, so as to be substantially at the same height as valley portions 1r, as depicted in FIGS. 6-B, and C, as the window glass 3 slides along the window weather stripping 1, thus increasing the coefficient of friction. Further, FIG. 6-B shows the state where the projected portions 1p of the weather stripping are partially and irregularly worn away; the FIG. 6-C shows the state where the projected portions 1p of the weather stripping are fully and uniformly worn away. Briefly, the depth of interengagement 1 is relatively great in the prior-art weather stripping.

In view of the above description, reference is now made to the window weather stripping according to the present invention.

Figure 7:
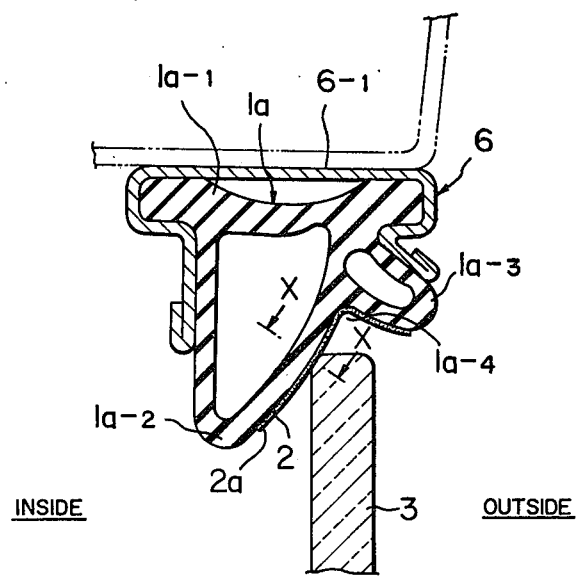
FIG. 7 is the same enlarged cross-sectional view taken along the lines II—II of FIG. 1 as in FIG. 2, showing the window weather stripping according to the present invention.

FIG. 7 shows an upper window weather stripping 1a according to the present invention, which is attached to a door sash 6. The window weather stripping of this type includes a base portion 1a-1 fixed to the bottom portion 6-1 of the door sash 6, a main seal lip portion 1a-2 extending from the base portion 1a-1 toward a passenger compartment side (inside), a sub-lip portion 1a-3 extending from the base portion 1a-1 toward the outside, and a recessed portion 1a-4 between the main seal lip portion and the sub-lip portion toward which a window glass 3 is brought into pressure-contact when moved upward.

The upper window weather stripping is integrally formed by extrusion-molding a soft elastic material such as synthetic resin (for instance, vinyl chloride) or rubber.

Figure 10:
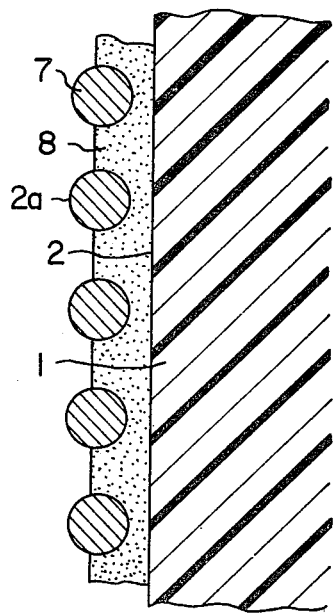
FIG. 10 is an enlarged cross-sectional view microscopically showing a sliding surface of a first embodiment of the window weather stripping according to the present invention.

On the sliding surface 2 of the upper window weather stripping 1a on which the glass window 3 slides, there is formed a rough surface 2a on which particles 7 are fixed by a bonding agent 8 in such a way that particles 7 project beyond the outer surface of the bonding agent 8, as depicted in FIG. 10.

Figure 8:
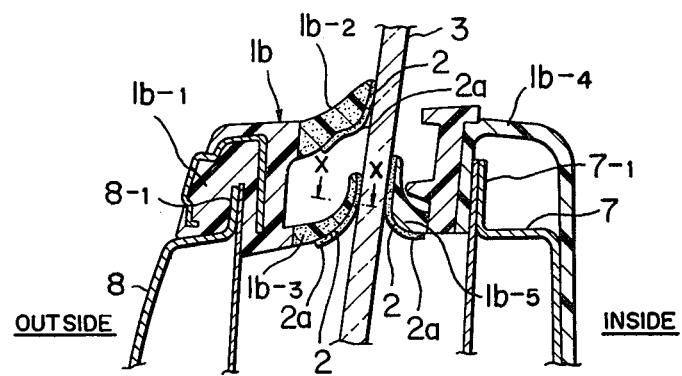
FIG. 8 is the same enlarged cross-sectional view taken along the lines III—III of FIG. 1 as in FIG. 3, showing the window weather stripping according to the present invention.

FIG. 8 shows a lower window weather stripping 1b according to the present invention, which is attached between an inner door panel 7 and an outer door panel 8. The window weather stripping of this type includes an outside base portion 1b-1 fitted to the upper flange portion 8-1 of the outer door panel 8, an upper and lower outside seal lip portions 1b-2 and 1b-3 extending from the outside base portion 1b-1 inwardly toward the window glass 3, an inside base portion 1b-4 fitted to the upper flange portion 7-1 of the inner door panel 7, and an inside lower lip portion 1b-5 extending from the inside base portion 1b-4 outwardly toward the window glass 3.

The window glass 3 is slidably sandwiched between the two outside upper and lower seal lip portions 1b-2 and 1b-3 and the inside seal lip portion 1b-5.

The outside window weather stripping and the inside window weather stripping are separately formed by extrusion-molding a soft elastic material such as synthetic resin (for instance, vinyl chloride) or rubber. On the sliding surfaces 2 of these three inside and outside seal lip portions of the lower window weather stripping 1b on which the glass window 3 slides, there are formed rough surfaces 2a on which particles 7 are fixed by a bonding agent 8 in such a way that the particles 7 project beyond the outer surface of the bonding agent 8, as depicted in FIG. 10.

Figure 9:
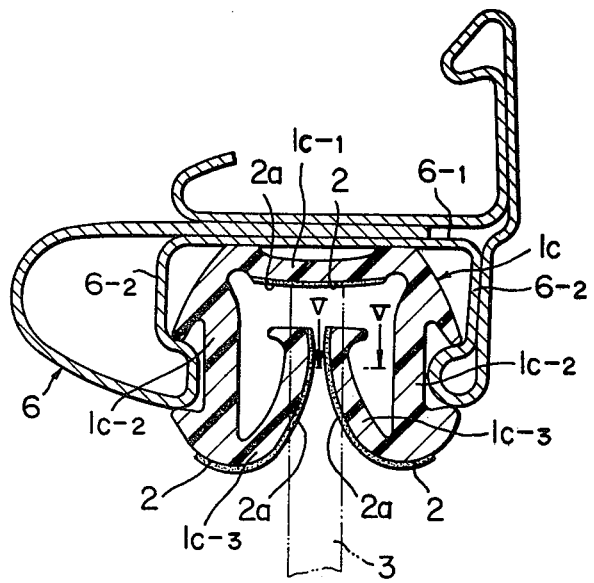
FIG. 9 is the same enlarged cross-sectional view taken along the lines IV—IV of FIG. 1 as in FIG. 4, showing the window weather stripping according to the present invention.

FIG. 9 show a side window weather stripping 1c according to the present invention, which is attached to a door sash 6. The window weather stripping of this type includes a base portion 1c-1 fitted to the bottom portion 6-1 of the door sash 6, two side wall portions 1c-2 fixed to the side wall portions 6-2 of the door sash 6 extending from either end of the base portion 1c-1, and two lip portions 1c-2 extending from the two side wall portions 6-2 inwardly toward the base portion 1c-1.

The window glass 3 is slidably sandwiched between the two lip portions 1c-3 and brought into pressure-contact with the base portion 1c-1.

The side window weather stripping is integrally formed by extrusion-molding a soft elastic material such as synthetic resin (for instance, vinyl chloride) or rubber.

On the three sliding surfaces 2 of the side window weather stripping 1c on which the glass window 3 slides, there are formed rough surfaces 2a on which particles 7 are fixed by a bonding agent 8 in such a way that the particles 7 project beyond the outer surface of the bonding agent 8, as depicted in FIG. 10.

In the door weather stripping described above, it is preferable to use a bonding agent 8 from the urethane-based bond, nylon-based bond, polyvinyl chloride-based bond, chloroprene-based bond, nitrile rubber-based bond, acrylic-based bond, expoxide-based bond, or other suitable bonding agents for rubber or vinyl chloride.

For the particles 7, it is preferable to use talc, silica, nylon, molybdenum bisulfide, ethylene tetrafluoride, or other suitable smooth-textured particles.

Furthermore, the greater the diameter of the particles, the less the sliding resistance; however, a diameter of from 5 to 500$\mu$ is desirable from the standpoint of adhesion to the sliding surface of the window weather stripping. In addition, a hardness of from 2 to 7 on the Mohs scale is preferable from the standpoint of damage to the window glass, since this is less than that of window glass (7 on the Mohs scale) but greater than that of window weather stripping body material. Additionally, it is desirable to use particles with low abrasivity and good bonding characteristics.

Figure 11:
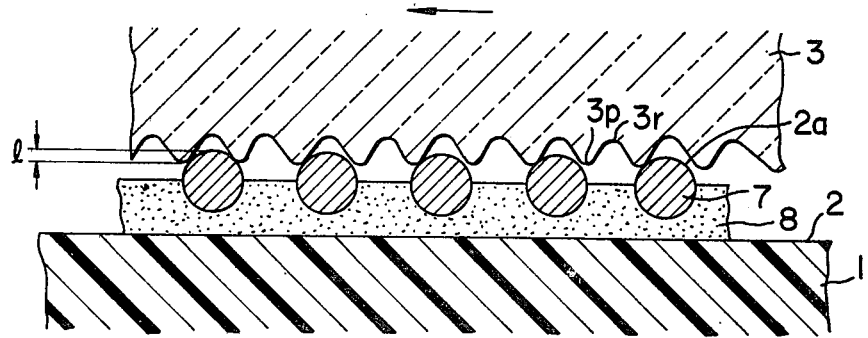
FIG. 11 is an enlarged cross-sectional view microscopically showing a sliding surface of the first embodiment of the window weather stripping according to the present invention, indicating that particles on the first embodiment of the window weather stripping according to the present invention are interengaged with the recessed portions of the window glass.

FIG. 11 microscopically shows the interface of the window weather stripping according to the present invention with the window glass, for assistance in explaining the sliding resistance. As depicted in the figure, since the particles 7 forming a rough surface 2a are in tangential contact with the projection portions 3p of the window glass 3, the contact area is reduced. Additionally, since the hardness of the particles 7 is greater than that of the elastic material used for the weather stripping, the depth of interengagement 1 (mean height of particles 7 within the recessed portions 3r of the window glass 3) is also reduced. Therefore, as the window glass 3 slides along the sliding surface 2, the particles 7 are not easily worn away by the window glass 3. In other words, since the coefficient of friction of the rough surface 2a on which the window glass 3 slides is reduced markedly, the sliding resistance is accordingly reduced markedly.

Furthermore, since the particles 7 fixed to the sliding surface 2 of the weather stripping are embedded in the bonding agent 8 or mixed throughout, the particles bonded onto the sliding surface form irregular multiple layers, so that as the particles 7 wear away, others are exposed to perform the same function, thus the life-time of the window weather stripping according to the present invention is very long.

Furthermore, if colored particles are used, it is possible to color the sliding surfaces of the weather stripping; that is, it is possible to enhance the decorative effect.

Figure 12:
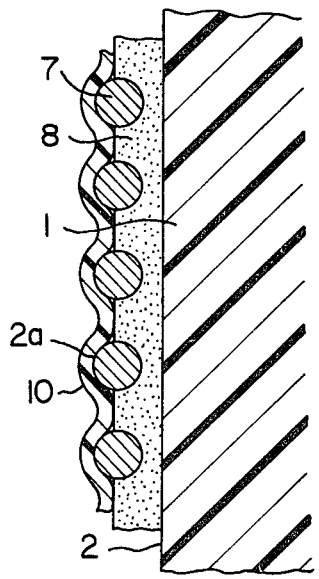
FIG. 12 is an enlarged cross-sectional view microscopically showing a sliding surface of a second embodiment of the window weather stripping according to the present invention.

FIG. 12 shows a second embodiment of the window weather stripping according to the present invention. In this embodiment, there is further formed a coated film 10 made of a thermoplastic synthetic resin such as acryl, styrene or nylon on the rough surface 2a formed by the bonding agent 8 mixed with particles 7. The thickness of the thermoplastic synthetic resin film 10 is less than the diameter of the particles, in order to maintain the roughness on the rough surface 2a of the sliding surface 2 of the window weather stripping.

Figure 13:
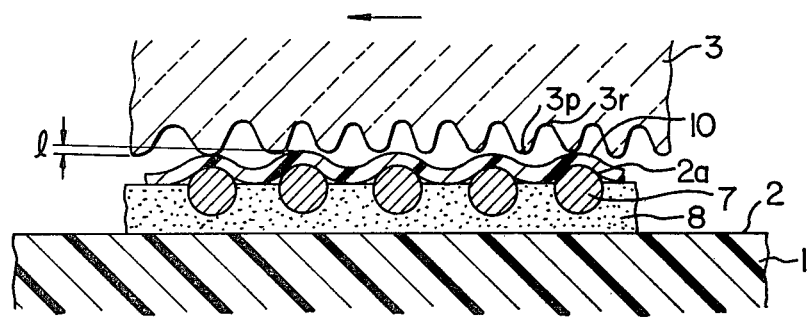
FIG. 13 is an enlarged cross-sectional view microscopically showing a sliding surface of the second embodiment of the window weather stripping according to the present invention, indicating that particles on the second embodiment of the weather stripping are interengaged with the recessed portions of the window glass.

FIG. 13 microscopically shows the interface of the second embodiment of the window weather stripping according to the present invention with the window glass, for assistance in explaining its effect on sliding resistance. In this second embodiment, since the window weather stripping is in sliding contact with the window glass 3 via the rough surface 2a coated with a thermoplastic synthetic resin film 10, the resin film 10 is more uniformly in point contact with the projection portions 3p of the window glass 3. Therefore, the contact area is reduced. Additionally, since the hardness of the particles 7 is greater than that of the elastic material used for the weather stripping body, the depth of interengagement l (mean height of particles 7 within the recessed portions 3r of the window glass 3) is also reduced. Therefore, when the window glass 3 slides on the sliding surface 2, the particles 7 and the coated resin film 10 are not easily worn away by the window glass 3. Additionally, the friction coefficient of the rough surface 2a on which the window glass 3 slides is reduced markedly, so that the sliding resistance is accordingly reduced markedly.

Since the particles 7 are coated by the resin film 10 on the sliding surface 2 of the weather stripping, the particles 7 are not worn away easily and thus the life time of the window weather stripping according to the present invention is very long.

Additionally, if colored resin film is used, it is possible to color the sliding surfaces of the window weather stripping; that is, it is possible to enhance the decorative effect.

Now, with reference to the attached drawings, the method of manufacturing the first embodiment (without resin film on the rough surfaces) of the window weather stripping according to the present invention is set forth hereinbelow.

Figure 14:
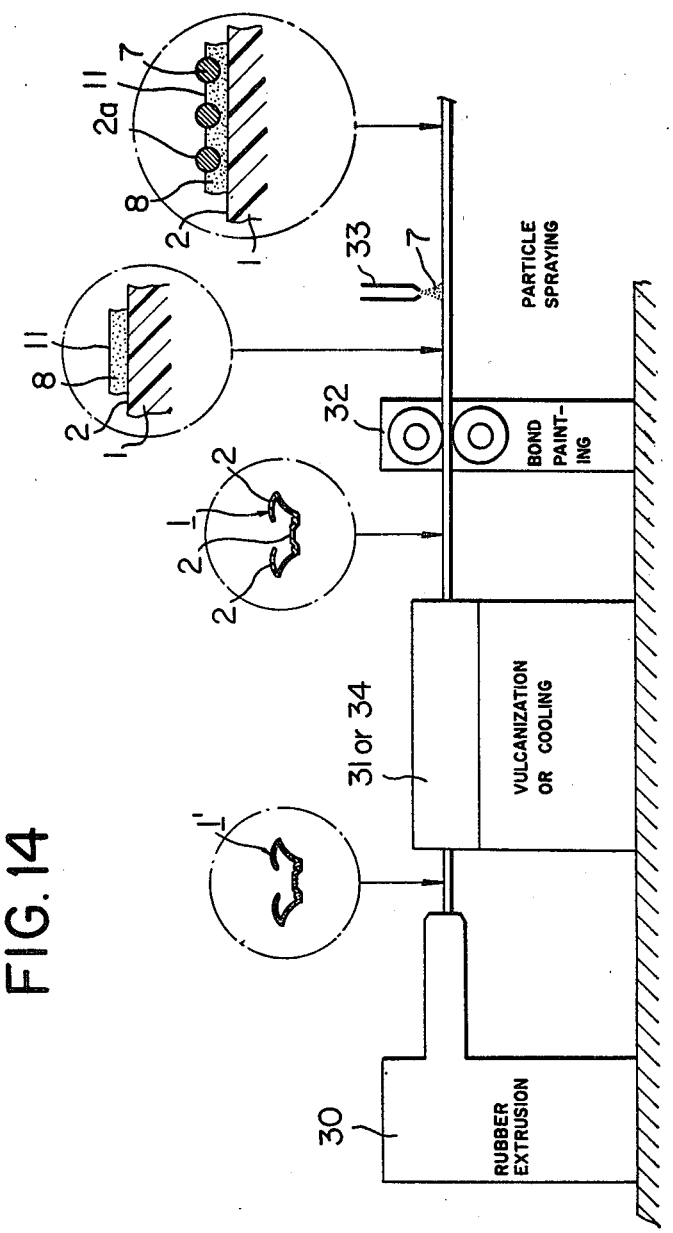
FIG. 14 is a pictorial side view showing a first method of manufacturing the first embodiment of the rubber window weather stripping according to the present invention.

FIG. 14 shows a first method of manufacturing the first embodiment of the rubber window weather stripping according to the present invention.

In this first method, a rubber material is first extrusion-molded into a predetermined shape 1' by an extruding machine 30. Next, the moulded window weather strip is vulcanized into a final predetermined shape 1 by a vulcanizing machine 31. Thirdly, a bonding agent 8 is painted on the sliding surfaces 2 of the vulcanized weather strip body 1 by a roller painting machine 32 in order to form a bonding layer 11. Fourthly, the particles 7 are sprayed onto the bonding layer 11 through a jet nozzle 33 to form a rough surface 2a thereon. Lastly, the sprayed bonding agent is dried and then baked in a heater (not shown). That is to say, the first method of rubber weather strip is as follows: rubber extrusion (1st step), rubber vulcanization (2nd step), bond painting (3rd step), particle spraying (4th step), bond drying (5th step), and bond baking (6th step), as depicted in FIG. 14.

Figure 15:
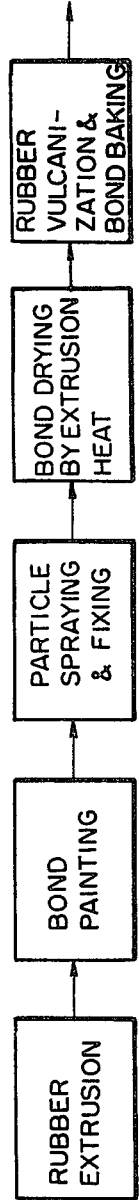
FIG. 15 is a flowchart showing a second method of manufacturing the first embodiment of the rubber window weather stripping according to the present invention.

FIG. 15 shows a second method of manufacturing the same rubber window weather strip according to the present invention. The points which are different from the first method are that the steps of painting the bonding agent, spraying the particles, and drying the bond are performed by utilizing the heat generated when the rubber material is extruded. Therefore, the step of vulcanizing rubber is performed at the last step together with the step of baking the bonding agent. That is to say, the second method of rubber weather strip is as follows: rubber extrusion (1st step), bond painting (2nd step), particle spraying (3rd step), bond drying by extrusion heat (4th step) and rubber vulcanization and bond baking (5th step), as depicted in FIG. 15.

Figure 16:
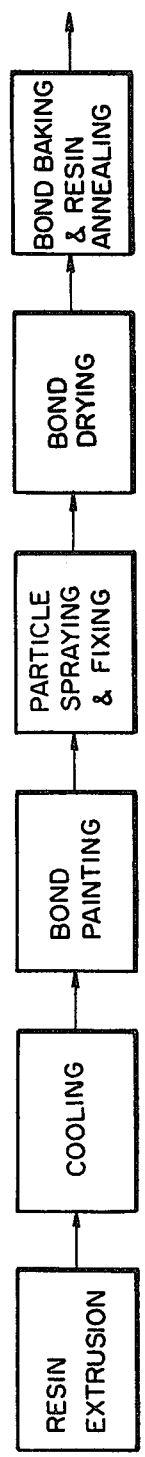
FIG. 16 is a flowchart showing a first method of manufacturing the first embodiment of the thermoplastic synthetic resin window weather stripping according to the present invention.

FIG. 16 shows a first method of manufacturing the first embodiment (without resin film on the rough surfaces) of the thermoplastic synthetic resin window weather strip according to the present invention.

In this first method, a thermoplastic synthetic resin material such as vinyl chloride is first extrusion-molded into a predetermined shape 1' by an extrusion machine. Next, the extruded window weather strip is cooled into a final predetermined shape 1 by a cooling machine 34. Thirdly, a bonding agent 8 is painted onto the sliding surfaces 2 of the cooled weather strip 1 by a roller painting machine 32 in order to form a bonding layer 11. Fourthly, the particles 7 are sprayed onto the bonding layer 11 through a jet nozzle 33 to form a rough surface 2a. Fifthly, the bonding agent is dried by a dryer. Lastly, the dried bonding agent is baked and the extruded vinyl chloride is annealed at a high temperature at the same time. That is to say, the first method for the manufacture of thermoplastic synthetic resin window weather strip is as follows: thermoplastic synthetic resin extrusion (1st step), extruded resin cooling (2nd step), bond painting (3rd step), particle spraying (4th step), bond drying (5th step) and painted bond baking and extruded resin annealing (6th step), as depicted in FIG. 16.

Figure 17:
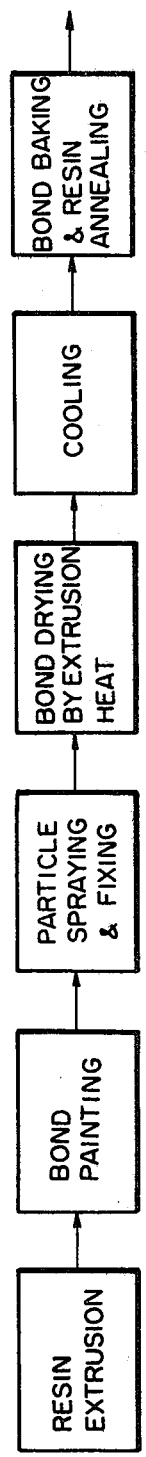
FIG. 17 is a flowchart showing a second method of manufacturing the first embodiment of the thermoplastic synthetic resin window weather stripping according to the present invention.

FIG. 17 shows second method of manufacturing the first embodiment of the thermoplastic synthetic resin window weather strip according to the present invention. The points different from the first method are that the steps of painting the bonding agent, spraying the particles, and drying the bond are performed by utilizing the heat generated when the thermoplastic synthetic resin is extruded. Therefore, the step of cooling is performed after the step of drying the bonding agent by utilizing extrusion heat. That is to say, the second method of manufacture of the thermoplastic synthetic resin window weather strip is as follows: thermoplastic synthetic resin extrusion (1st step), bond painting (2nd step), particle spraying (3rd step), bond drying by extrusion heat (4th step), cooling (5th step), and bond baking and thermoplastic synthetic resin annealing (6th step), as depicted in FIG. 17.

Figure 18:
FIG. 18 is a flowchart showing a third method of manufacturing the first embodiment of the rubber window weather stripping according to the present invention.

FIG. 18 shows a third method of manufacturing the first embodiment (without resin film on the rough surfaces) of the rubber window weather strip according to the present invention.

In this third embodiment, a rubber material is first extrusion-molded into a predetermined shape 1' by an extrusion machine 30. Next, the bonding agent 8 mixed with the particles 7 is painted onto the sliding surfaces 2 of the molded window weather strip 1 by a roller painting machine 32 in order to form a rough surface 2a. Thirdly, the painted bonding agent is dried by utilizing the heat generated when the rubber material is extruded. Lastly, the formed rubber is vulcanized and the painted bonding agent is baked. That is to say, the third method of manufacture of rubber weather strip is as follows: rubber extrusion (1st step), particle and bond painting (2nd step), bond drying by extrusion heat (3rd step) and rubber vulcanization and bond baking (4th step), as depicted in FIG. 18.

Figure 19:
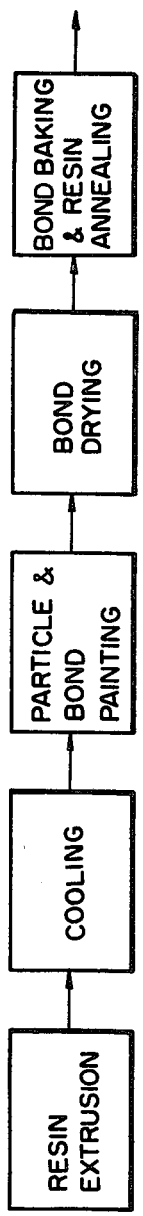
FIG. 19 is a flowchart showing a third method of manufacturing the first embodiment of the thermoplastic synthetic resin window weather stripping according to the present invention.

FIG. 19 shows a third method of manufacturing the first embodiment of the thermoplastic synthetic resin window weather strip according to the present invention.

In this third method, a thermoplastic synthetic resin material such as vinyl chloride is first extrusion-molded into a predetermined shape 1' by an extrusion machine. Next, the molded weather strip is cooled into a final predetermined form 1 by a cooling machine 34. Thirdly, a bonding agent 8 mixed with particles 7 is painted onto the sliding surfaces 2 of the cooled window weather strip 1 by a roller painting machine 32 in order to form a rough surface 2a. Fourthly, the bonding agent is dried by a dryer. Lastly, the dried bonding agent is baked and the extruded vinyl chloride is annealed at a high temperature at the same time. That is to say, the third method of manufacturing the first embodiment of the thermoplastic synthetic resin window weather strip is as follows: thermoplastic synthetic resin extrusion (1st step), extruded resin cooling (2nd step), bonding agent and particle painting (3rd step), painted bond drying (4th step) and painted bond baking and extruded resin annealing (5th step), as depicted in FIG. 19.

Figure 20:
FIG. 20 is a flowchart showing a fourth method of manufacturing the first embodiment of the thermoplastic synthetic resin window weather stripping according to the present invention.

FIG. 20 shows a fourth method of manufacturing the first embodiment of thermoplastic synthetic resin window weather strip according to the present invention. The points different from the third method are that the steps of painting the bonding agent mixed with the particles and drying the painted bond are performed by utilizing the heat generated when the thermoplastic synthetic resin is extruded. Therefore, the step of cooling is performed after the step of drying the bonding agent by utilizing extrusion heat. That is to say, the fourth method of manufacture of the first embodiment of thermoplastic synthetic resin weather strip is as follows: thermoplastic synthetic resin extrusion (1st step), particle and bond painting (2nd step), painted bond drying by extrusion heat (3step), cooling (4th step) and bond baking and thermoplastic synthetic resin annealing (5th step).

Figure 21:
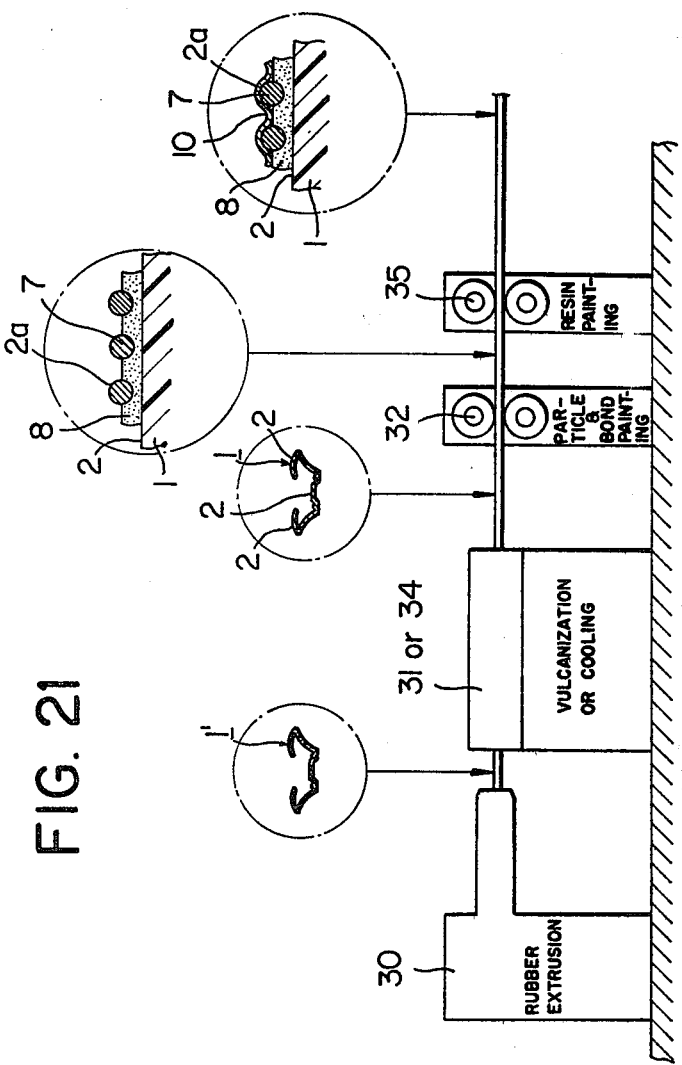
FIG. 21 is a pictorial side view showing a third method of manufacturing the second embodiment of the rubber window weather stripping according to the present invention.

FIG. 21 shows a third method of manufacturing the second embodiment of the rubber window weather strip having a coated film made of a thermoplastic synthetic resin according to the present invention.

In this third method, a rubber material is first extrusion-molded into a predetermined shape 1' by an extrusion machine 30. Next, the molded window weather strip is vulcanized into a final predetermined shape 1 by a vulcanizing machine 31. Thirdly, a bonding agent 8 mixed with particles 8 is painted onto the sliding surfaces 2 of the vulcanized weather strip 1 by a first roller painting machine 32 in order to form a rough surface 2a. Fourthly, a thermoplastic resin such as acryl, styrene or nylon is painted over the rough surface 2a formed by a bonding agent 8 mixed with particles 7 by a second roller painting machine 35, in order to form a resin film 10 thereon. Lastly, the painted bond and film are baked by a heater. That is to say, the third method of manufacture of rubber weather strip having a coated film thereon is as follows: rubber extrusion (1st step), extruded rubber vulcanization (2nd step), particle and bond painting (3rd step), resin film painting (4th step), and painted bond and resin baking (5th step), as depicted in FIG. 21.

Figure 22:
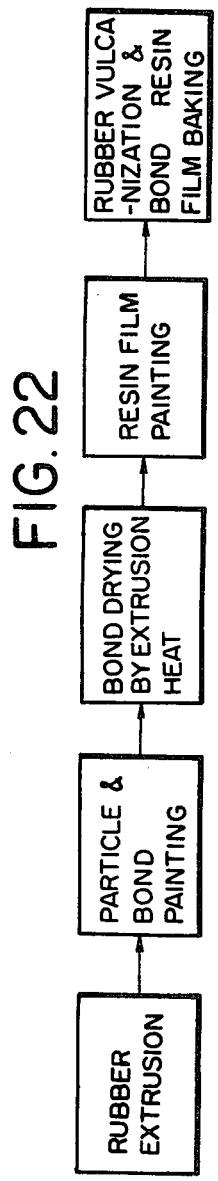
FIG. 22 is a flowchart showing a fourth method of manufacturing the second embodiment of the rubber window weather stripping according to the present invention.

FIG. 22 shows a fourth method of manufacturing the second embodiment of the rubber window weather strip coated with a film of thermoplastic synthetic resin according to the present invention. The points different from the third method are that the steps of painting the bonding agent mixed with the particles, drying the bonding agent mixed with the particles, and painting the resin film are performed by utilizing the heat generated when the rubber material is extruded. Therefore, the step of vulcanizing rubber is performed at the last step together with the step of baking the bonding agent resin film. That is to say, the fourth method of manufacture of rubber weather strip is as follows: rubber extrusion (1st step), particle and bond painting, bond drying by extrusion heat (3rd step), resin film painting (4th step) and rubber vulcanization and bond and resin film baking (5th step), as depicted in FIG. 22.

Figure 23:
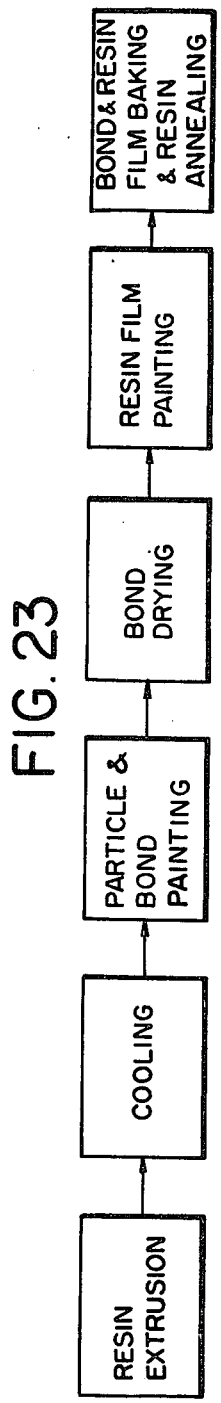
FIG. 23 is a flowchart showing a third method of manufacturing the second embodiment of the thermoplastic synthetic resin window weather stripping according to the present invention.

FIG. 23 shows a third method of manufacturing the second embodiment of the thermoplastic synthetic resin window weather strip coated with a film of thermoplastic synthetic resin according to the present invention.

In this third method, a thermoplastic synthetic resin material such as vinyl chloride is first extrusion-molded into a predetermined shape 1' by an extrusion machine. Next, the extruded door weather strip is cooled into a final predetermined shape 1 by a cooling machine 34. Thirdly, a bonding agent 8 mixed with particles 7 is painted onto the sliding surfaces 2 of the cooled weather strip 1 by a roller painting machine 32 in order to form a rough surface 2a. Fourthly, the painted bonding material is dried by a dryer. Fifthly, a thermoplastic resin film such as acryl, styrene or nylon is painted over the rough surface 2a formed by the bonding agent 8 mixed with the particles 7 by a second roller painting machine 35, in order to form a coated film 10. Lastly, the bond and film are baked and the resin material is annealed. That is to say, the third method of manufacture of the thermoplastic synthetic resin window weather strip coated with a film is as follows: thermoplastic synthetic resin extrusion (1st step), extruded resin cooling (2nd step), particle and bond painting (3rd step), painted bond drying (4th step), resin film painting (5th step), and painted bond and resin film baking and extruded and painted resin annealing (6th step), as depicted in FIG. 23.

Figure 24:
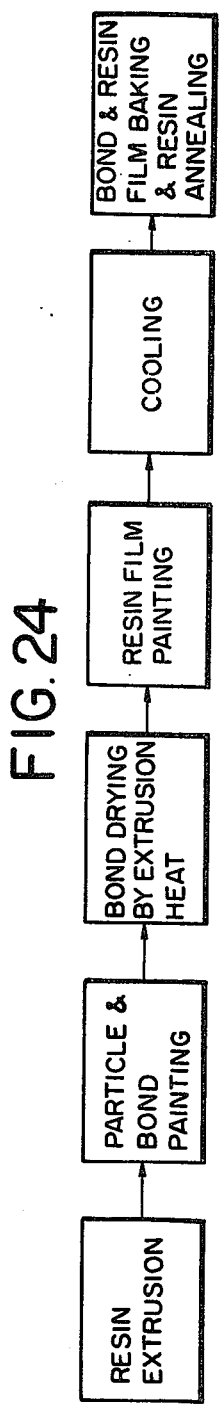
FIG. 24 is a flowchart showing a fourth method of manufacturing the second embodiment of the thermoplastic synthetic resin window weather stripping according to the present invention.

FIG. 24 shows a fourth method of manufacturing the second embodiment of the thermoplastic synthetic resin window weather strip coated with a film of thermoplastic synthetic resin according to the present invention. The points different from the third method are that the steps of painting the bonding agent mixed with the particles, drying the painted bond and painting the resin film are performed by utilizing the heat generated when the resin material is extruded. Therefore, the step of cooling is performed after the step of painting the resin film. That is to say, the fourth method of thermoplastic synthetic resin window weather strip is as follows: thermoplastic synthetic resin extrusion (1st step), particle and bond painting (2nd step), painted bond drying (3rd step), resin film painting (4th step), painted resin cooling (5th step), and painted bond and resin film baking and extruded and painted resin annealing (6th step).

To avoid confusion, now follows the description of the ordinal numbers representing the methods and embodiments used above.

The first embodiment means the window weather stripping according to the present invention which has no thermoplastic synthetic resin film on the rough surface.

The second embodiment means the window weather stripping according to the present invention, which has a thermoplastic synthetic resin film on the rough surface.

The first and second methods of manufacturing the window weather stripping according to the present invention means the method in which the rough surfaces are formed by first painting a bonding agent and by secondly spraying particles on the painted bond, that is, forming the rough surface in two separate steps.

The third and fourth methods of manufacturing the window weather stripping according to the present invention means the method in which the rough surfaces are formed by painting a bonding agent mixed with particles, that is, by a single step. Further, in the second and fourth methods, the heat generated when the window weather strip is molded is utilized for drying the painted bonding agent.

Lastly, the following experiments have been made in order to compare the friction coefficients of the various window weather strip according to the present invention with those of the prior-art window weather strip on which a number of projections are formed. FIG. 25 lists the experiment results.

Figure 26:
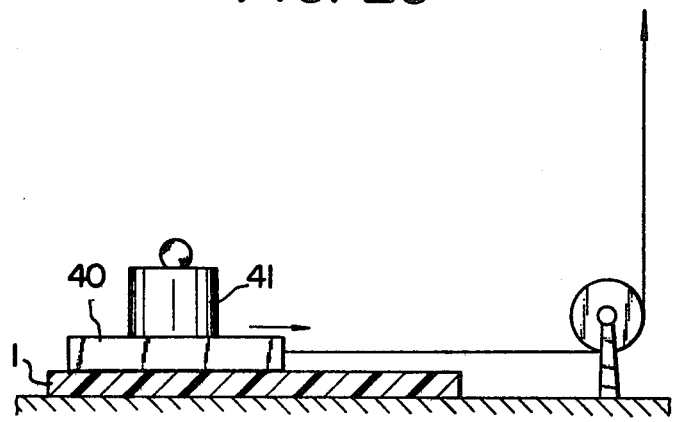
FIG. 26 is an illustration showing the method of measuring the friction coefficients of the window weather stripping according to the present invention.

The friction coefficients are measured by sliding a glass plate 40 on which a weight 41 is mounted across a sheet of rough-surfaced material, as depicted in FIG. 26. The total weight W is 1,110 g including the glass (weight 41: 1,000 g glass 40: 110 g). The sample size is 40 mm wide, 120 mm long and 2 mm thick. A tension F is applied to the glass plate so that a sliding speed of 500 mm/min. will be maintained.

The sample A is prior-art window weather strip on the surface of which a number of projections are formed, as in the prior art, without any particles and bonding agent thereon. Its coefficient of friction is 1.88.

The sample B is another prior-art window weather strip, on the surface of which no projections are formed. In this sample B, the coefficients of friction are 2 or more (no sliding condition but close contact) in the cases where no bonding agent is used or where only urethane bond without any particles is used, and 0.34 in the case where only nylon bond without any particles is used.

The sample C is window weather strip according to the present invention on the surface of which talc particles with a diameter of 8μ, mixed with two kinds of bonding agents at a ratio of 25 percent, are applied. In this sample C, the coefficients of friction are 0.67 in the case where urethane bond is used and 0.23 in the case where nylon bond is used.

The sample D is window weather strip according to the present invention on the surface of which nylon powder with a diameter of 60μ, mixed with two kinds of bonding agents at a ratio of 25 percent, is applied. In this sample D, the coefficients of friction are 0.36 in the case where urethane bond is used and 0.20 in the case where nylon bond is used.

The sample E is window weather strip according to the present invention on the sliding surface of which nylon powder with a diameter of 100μ, mixed with two kinds of bonding agents at a ratio of 25 percent, is applied. In this sample E, the coefficients of friction are 0.16 in the case where urethane bond is used and 0.15 in the case where nylon bond is used.

The sample F is window weather strip according to the present invention on the sliding surface of which nylon powder with a diameter of 100μ, mixed with urethane bond at a ratio of 25 percent and covered by a nylon film, is applied. In this case, the coefficient of friction is 0.17, which is almost the same as in the sample E without the nylon film.

The sample G is a prior-art window weather strip on the surface of which textile nap is bonded with urethane bond. The coefficient of friction is 0.32.

The list shown in FIG. 25 indicates that:

(a) nylon bond is better than urethane bond with respect to coefficient of friction, (b) the larger the particle diameter, the less the coefficient of friction, (c) the resin (nylon) film does not notably change the coefficient of friction, (d) the coefficients of friction of the present invention are reduced markedly.

As described above, since a rough surface including particles is formed on the sliding surfaces of the window weather strip on which window glass slides, the coefficient of friction between the weather strip and window glass is markedly reduced and the sliding resistance is accordingly reduced.

Furthermore, since the particles are strongly fixed onto the sliding surfaces by bonding agent, the particles are not easily worn away and therefore the life time of the rough surfaces is relatively long.

Furthermore, since a thermoplastic synthetic resin film thinner than the diameter of the particles can be formed on the rough surface to such an extent that the roughness is maintained, the coefficient of friction between the weather strip and window glass can be reduced and therefore the sliding resistance can be reduced even further.

Furthermore, since the particles can be covered by a thermoplastic synthetic resin film, the particles can not easily wear away and therefore the life-time of the rough surfaces can be extended.

Furthermore, since the rough surfaces are formed on the sliding surfaces, rain water thereon will drain well.

Furthermore, since the rough surfaces are formed by painting the bonding agent mixed with particles onto the sliding surfaces by using a roller painting machine and since the thermoplastic synthetic resin film is also formed by painting the resin by using another roller painting machine, the manufacturing steps are simplified and the materials can be well controlled, the productivity is high, thus reducing the manufacturing cost.

Furthermore, if color bonding agent or color resin film is used, it is possible to color the sliding surfaces, thus improving the decorative effect.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. Window weather stripping for sealing a gap between a movable glass and a window frame which comprises:
 a strip of elastic material having a microscopically rough surface on at least the surface of said strip along which the movable window glass slides, said rough surface comprising nylon particles bonded to said strip surface by a paint consisting essentially of nylon particles contained in a nylon-based bonding agent.

2. Window weather stripping as set forth in claim 1, wherein the diameter of the nylon particles ranges from 5 to 500 micron.

3. Window weather stripping as set forth in claim 1, wherein nylon bonding agent is additionally coated on said paint.

4. Window weather stripping as set forth in claim 1, wherein the strip of elastic material is rubber.

5. Window weather stripping as set forth in claim 1, wherein the strip of elastic material is vinyl chloride resin.

* * * * *